US008149261B2

(12) United States Patent
Sarkar et al.

(10) Patent No.: US 8,149,261 B2
(45) Date of Patent: Apr. 3, 2012

(54) INTEGRATION OF AUDIO CONFERENCE BRIDGE WITH VIDEO MULTIPOINT CONTROL UNIT (75) Inventors: Shantanu Sarkar, San Jose, CA (US); Randall B. Baird, Austin, TX (US); Stuart Asbury Taylor, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 1414 days.

(21) Appl. No.: 11/652,433

(22) Filed: Jan. 10, 2007

(65) Prior Publication Data
US 2008/0165245 A1 Jul. 10, 2008

(51) Int. Cl.
*H04N 7/14* (2006.01)
(52) U.S. Cl. ....................................... 348/14.09
(58) Field of Classification Search ............... 348/14.09, 348/14.08
See application file for complete search history.

(56) References Cited

U.S. PATENT DOCUMENTS

| 5,483,587 | A | 1/1996 | Hogan et al. |
| 5,600,366 | A | 2/1997 | Schulman |
| 5,673,253 | A | 9/1997 | Shaffer |
| 5,729,687 | A | 3/1998 | Rothrock et al. |
| 5,917,830 | A | 6/1999 | Chen et al. |
| 5,963,217 | A | 10/1999 | Grayson et al. |
| 6,044,081 | A | 3/2000 | Bell et al. |
| 6,141,324 | A | 10/2000 | Abbott et al. |
| 6,236,854 | B1 | 5/2001 | Bradshaw |
| 6,269,107 | B1 | 7/2001 | Jong |
| 6,332,153 | B1 | 12/2001 | Cohen |
| 6,501,739 | B1 | 12/2002 | Cohen |
| 6,505,169 | B1 | 1/2003 | Bhagavath et al. |
| 6,608,820 | B1 | 8/2003 | Bradshaw |
| 6,671,262 | B1 | 12/2003 | Kung et al. |
| 6,675,216 | B1 | 1/2004 | Quatrano et al. |
| 6,718,553 | B2 | 4/2004 | Kenworthy |
| 6,735,572 | B2 | 5/2004 | Landesmann |
| 6,771,644 | B1 | 8/2004 | Brassil et al. |
| 6,771,657 | B1 | 8/2004 | Elstermann |
| 6,775,247 | B1 | 8/2004 | Shaffer et al. |
| 6,816,469 | B1 | 11/2004 | Kung et al. |
| 6,865,540 | B1 | 3/2005 | Faber et al. |
| 6,876,734 | B1 | 4/2005 | Summers et al. |
| 6,925,068 | B1 | 8/2005 | Stanwood et al. |
| 6,931,001 | B2 | 8/2005 | Deng |
| 6,931,113 | B2 | 8/2005 | Ortel |

(Continued)

FOREIGN PATENT DOCUMENTS
EP  1 553 735 A1  7/2005

*Primary Examiner* — Stella Woo
(74) *Attorney, Agent, or Firm* — Baker Botts L.L.P.

(57) ABSTRACT

In one embodiment, a system includes a video multipoint control unit (MCU) and an audio conferencing bridge, the audio conferencing bridge being operable to receive audio streams from audio-only and video endpoints, and to negotiate video sessions between each of the video endpoints and the video MCU. In response to detecting when one of the video endpoints is an active speaker, the audio conferencing bridge transmitting a dummy audio stream over a dummy audio channel from the audio conferencing bridge to the video MCU. The dummy audio stream causes the video MCU to switch an image in a video output stream. It is emphasized that this abstract is provided to comply with the rules requiring an abstract that will allow a searcher or other reader to quickly ascertain the subject matter of the technical disclosure.

25 Claims, 6 Drawing Sheets

U.S. PATENT DOCUMENTS

| | | |
|---|---|---|
| 6,937,569 B1 | 8/2005 | Sarkar et al. |
| 6,947,417 B2 | 9/2005 | Laursen et al. |
| 6,956,828 B2 | 10/2005 | Simard et al. |
| 6,959,075 B2 | 10/2005 | Cutaia et al. |
| 6,976,055 B1 | 12/2005 | Shaffer et al. |
| 6,989,856 B2 | 1/2006 | Firestone et al. |
| 7,003,086 B1 | 2/2006 | Shaffer et al. |
| 7,007,098 B1 | 2/2006 | Smyth et al. |
| 7,084,898 B1 | 8/2006 | Firestone et al. |
| 7,693,190 B2 * | 4/2010 | Firestone et al. .......... 348/14.09 |
| 2001/0000540 A1 | 4/2001 | Cooper et al. |
| 2003/0076850 A1 | 4/2003 | Jason, Jr. |
| 2003/0198195 A1 | 10/2003 | Li |
| 2004/0165710 A1 | 8/2004 | DelHoyo et al. |
| 2004/0213152 A1 | 10/2004 | Matuoka et al. |
| 2005/0069102 A1 | 3/2005 | Chang |

* cited by examiner

INTEGRATION OF AUDIO CONFERENCE BRIDGE WITH VIDEO MULTIPOINT CONTROL UNIT

TECHNICAL FIELD

This disclosure relates generally to the field of audio and video conferencing over a communications network.

BACKGROUND

Modern conferencing systems facilitate communications among multiple participants over telephone lines, Internet protocol (IP) networks, and other data networks. In a typical conferencing session, a participant enters the conference by using an access number. During the conference a mixer receives audio streams from the participants, determines the N loudest speakers, mixes the audio streams from the loudest speakers and sends the mixed audio back to the participants. In a video conference, both audio and video streams are mixed and delivered to the conference participants. In some cases, both audio-only participants and audio/video participants may join in the meeting.

Integrating video into an audio-only conferencing system often requires a large investment in the development of video codec technology, hardware architecture, and the implementation of video features necessary to produce a competitive product. To avoid this investment, developers have attempted to integrate an existing ("off-the-shelf") audio/video (A/V) multipoint control unit (MCU) with an existing audio-only product. Past approaches for accommodating such integration have typically involved hosting an audio conference on an audio bridge for audio-only participants and an A/V conference on the video MCU for the audio/video participants. The two conferences are then linked together by cascading the audio output of the audio conference as an input into audio/video conference, and vice versa. One problem with this approach, however, is that in-conference features are available for audio-only participants but not A/V participants. Furthermore, the audio quality as perceived by A/V users and audio-only users is different, which leads to customer dissatisfaction.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

In the following description specific details are set forth, such as device types, system configurations, communication methods, etc., in order to provide a thorough understanding of the present invention. However, persons having ordinary skill in the relevant arts will appreciate that these specific details may not be needed to practice the present invention.

In the context of the present application, a communications network is a geographically distributed collection of interconnected subnetworks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the devices or nodes include servers, mixers, control units, and personal computers. The nodes typically communicate by exchanging discrete frames or packets of data according to predefined protocols.

In general, an endpoint is a device that provides rich-media communications termination to an end user, client, or person who is capable of participating in an audio or video conference session via conferencing system. Endpoint devices that may be used to initiate or participate in a conference session include a personal digital assistant (PDA); a personal computer (PC), such as notebook, laptop, or desktop computer; an audio/video appliance; a streaming client; a television device with built-in camera and microphone; or any other device, component, element, or object capable of initiating or participating in exchanges with a video conferencing system.

Figure 1:
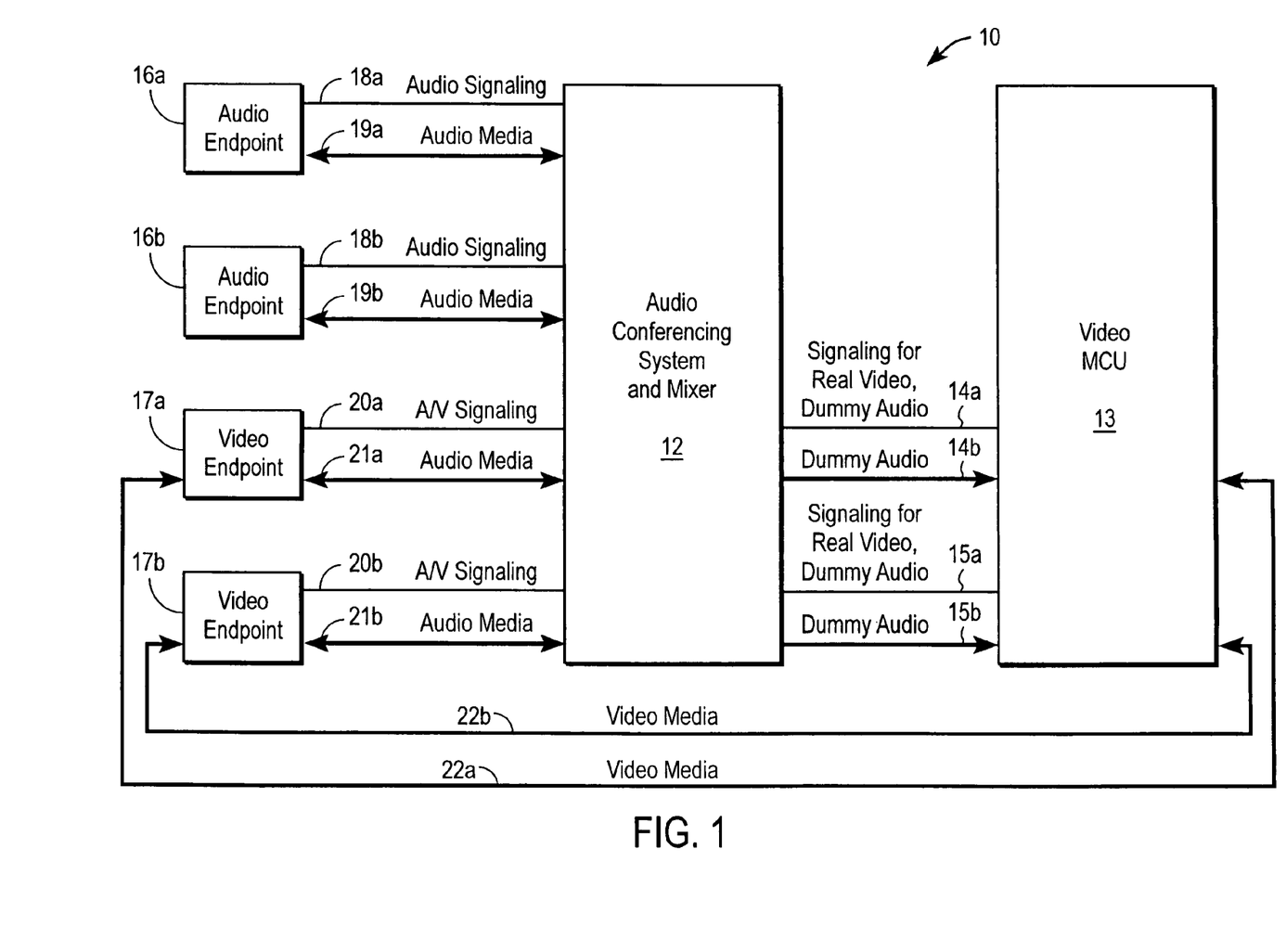
FIG. 1 illustrates an example architecture for a conferencing system that accommodates both audio and video endpoints.

FIG. 1 illustrates an example architecture for a conferencing system 10 that accommodates both audio and video endpoints 16 and 17, respectively. In this example, audio endpoints 16a & 16b are sources and sinks of audio content—that is, each sends an audio packet stream, which comprises speech received from an end-user via a microphone, to an audio conferencing system and mixer (i.e., audio bridge) 12. Audio bridge 12 mixes all received audio content and sends appropriately mixed audio back to audio endpoints 16a & 16b. The audio media is shown being transmitted bidirectionally between audio endpoints 16a & 16b and audio bridge 12 via data paths (channels) 19a & 19b, respectively. Audio signaling between audio endpoints 16a & 16b and audio bridge 12 occurs via respective connections 18a & 18b.

Similarly, video endpoints 17a & 17b are sources and sinks of both audio and video content. In other words, in addition to sending an audio packet stream to audio bridge 12, each of video endpoints 17 also sends a video packet stream to a video multipoint control unit (MCU) 13, also referred to as a video mixer, comprising video data received from a camera associated with the endpoint. Audio bridge 12 mixes received audio content and sends appropriately mixed audio back to video endpoints 17a & 17b. Note that all audio, whether it is from audio endpoints 16 or video endpoints 17, may be mixed in some manner. FIG. 1 illustrates the video media being sent bidirectionally between video endpoints 17a & 17b to video MCU 13 via data paths (channels) 22a & 22b, respectively. The audio media from video endpoints 17a & 17b is transmitted bidirectionally between audio bridge 12 via data paths 21a & 21b, respectively. Audio/video (A/V) signaling between video endpoints 17a & 17b and audio bridge 12 is respectively transmitted via connections 20a & 20b. The connections between audio bridge 12 and endpoints 16 & 17 may be over any communications protocol appropriate for multi-media services over packet networks, e.g., Session Initiation Protocol (SIP), the H.323 standard, etc. Non-standard signaling protocols, such as Extensible Mark-up Language (XML)

over Hyper Text Transfer Protocol (HTTP) or Simple Object Access Protocol (SOAP), may also be used to set up the connections.

It is appreciated that audio bridge 12 and video MCU 13 shown in FIG. 1 comprise separate, distinct devices or components that are physically located at different places on a communications network. In other embodiments, audio bridge 12 and video MCU 13 may be combined in a single physical unit or box. It should be further understood that audio bridge 12 represents any device or component that combines more than one audio input stream to produce a composite audio output stream. Similarly, video MCU 13 represents any device or component that combines multiple video input streams to produce a composite video output stream. In certain implementations, audio bridge 12 video MCU 13 may also operate to select one or more of a plurality of input media streams for output to various participants of a conference session.

In the embodiment shown, audio bridge 12 and video MCU 13 may each include a digital signal processor (DSP) or firmware/software-based system that mixes and/or switches audio/video signals received at its input ports under the control of a video conference server (not shown). The audio/video signals received at the conference server ports originate from each of the conference or meeting participants (e.g., individual conference participants using endpoint devices 16-17), and possibly from an interactive voice response (IVR) system. Conference mixer 12 may also incorporate or be associated with a natural language automatic speech recognition (ASR) module for interpreting and parsing speech of the participants, and standard speech-to-text (STT) and text-to-speech (TTS) converter modules.

As part of the process of mixing the audio transmissions of the N (where N is an integer $\geq 1$) loudest speakers participating in the conference session, audio conferencing system and mixer 12 may create different output audio streams having different combinations of speakers for different participants. For example, in the case where endpoint 16a is one of the loudest speakers in the conference session, conference mixer 12 generates a mixed audio output to endpoint 16a that does not include the audio of endpoint 10a. On the other hand, the audio mix output to endpoint 16b does include the audio generated by endpoint 16a since endpoint 16a is one of the loudest speakers. In this way, endpoint 16a does not receive an echo of its own audio output coming back from the audio mixer.

It should also be understood that, in different specific implementations, the media paths from endpoints 16 & 17 may include audio-only and A/V transmissions comprising Real-Time Transport Protocol (RTP) packets sent across a variety of different networks (e.g., Internet, intranet, PSTN, etc.), protocols (e.g., IP, Asynchronous Transfer Mode (ATM), Point-to-Point Protocol (PPP)), with connections that span across multiple services, systems, and devices.

In the embodiment shown, audio conferencing system and mixer 12 handles all of the control plane functions of the conference session and manages audio media transmissions and audio signaling with audio-only endpoints 16a & 16b, as well as audio media transmissions and audio/video signaling with video endpoints 17a & 17b. In a specific implementation, conferencing system and mixer 12 may run a modified or enhanced IP communication system software product such as Cisco's MeetingPlace™ conferencing application in order to perform these functions. In addition to establishing audio media channels 19a & 19b with audio-only endpoints 166a & 16b, audio bridge 12 also establishes video media channels 22a & 22b directly between respective video endpoints 17a & 17b and video MCU 13.

The example of FIG. 1 also includes a plurality of real video, dummy audio signaling connections 14a & 15a and dummy audio media (e.g., RTP) channels 14b & 15b between audio bridge 12 and video MCU 13 for respective video endpoints 17a & 17b. The purpose of dummy signaling connections 14 and dummy audio channels 15 is to provide a mechanism to indicate to the video MCU when one of the video endpoints 17 becomes an active speaker (e.g., one of the most recent loudest speakers) in the conference session. In response, video MCU 13 may switch its video output to the video image of the active speaker, or output a composite image that includes an image of the active-speaker, to each of video endpoints 17a & 17b. In this way, video policies that relay on active speaker changes can be implemented properly in the video mixer.

It is appreciated that the signaling protocol used between audio bridge 12 and video MCU 13 may be the same as, or different, from the protocol used for signaling between audio bridge 12 and endpoints 16 & 17. For example, the H.323 standard may be utilized for signaling connections between audio bridge 12 and endpoints 16 & 17, whereas the signaling connection between audio bridge 12 and video MCU 13 may use SIP. Non-standard signaling protocols may also be used for the signaling connections between the endpoints and the audio bridge, or between the audio bridge and the video MCU.

The actual audio content transmitted on channels 14b & 15b is used to indicate to video MCU 13 that a corresponding one of the video endpoints is currently an active speaker. The audio content, therefore, may comprise a small amount of default audio content consisting of audible speech transmissions (e.g., recorded speech consisting of "LA, LA, LA, LA, LA . . . "). This default or generic audio file ("clip") for use in transmission to video MCU 13 over channels 14b & 15b may be stored in a memory of audio bridge 12. When audio bridge 12 determines that the active speaker (or one of the N loudest speakers) originates from a video endpoint, the stored default audio clip containing predefined audio packets is sent to video MCU 13 via the dummy audio channel corresponding to that video endpoint. The audio clip may be repeated as many times as necessary so that the audible speech is continuous as long as the corresponding endpoint is an active speaker.

In a typical embodiment, only one of the dummy channels is active (i.e., is transmitting audible speech) at any given time, which minimizes the extra compute workload on the audio mixer. In certain implementations, audio bridge 12 may also attach a proper sequence number and time stamp to the dummy audio packets prior to sending them to the video MCU, so that the repeating clip represents a valid RTP stream. In any event, when a video endpoint participant stops being the active speaker, audio bridge 12 immediately halts the dummy audio RTP packet stream sent to video MCU 13 on the corresponding dummy audio channel. It is appreciated that inactive audio channels 14b and 15b may send a small amount of voice data to maintain the voice channels. This data may be sent, for example, using the RTP and/or RTCP protocols.

Multiple dummy audio packet streams can also be sent to video MCU 13 when the video mixer is configured to output a composite image comprising the N loudest speakers, and where the N loudest speakers consist of end-users participating via video endpoints. For example, if video MCU is configured to output a composite image that includes the two loudest speakers, and the two loudest happen to be the participants associated with endpoints 17a & 17b, then audio bridge 12 may output predefined dummy audio packet streams to video MCU 13 on dummy audio channels 14b and 15b.

Note that all of the control functions are handled by audio bridge 12. That is to say, all of the conference participants dial into the conference session via audio bridge 12, with audio bridge 12 providing the IP address, port numbers, etc., of video endpoints 17 to video MCU 13 to allow video MCU 13 to connect with endpoints 17a & 17b via media paths 22a & 22b, respectively. User interface commands (e.g., in the form of dual tone, multi-frequency (DTMF) keypad sequences/commands) for controlling the audio and video portions of the conference session are input to audio bridge 12. Commands sent to audio bridge 12 by users of endpoints 17a & 17b for controlling video content are translated by audio bridge 12 into the format appropriate for input to video MCU 13 via respective signaling connections 14a & 15a.

It is appreciated that in certain cases, a separate dial-in server may be utilized by the conferencing system for authenticating and connecting individual participants with the conference session handled by audio bridge 12.

In the example of FIG. 1, the audio portion and video portion of the conference session are mixed separately. The audio portion is mixed by audio bridge 12, while the video portion is mixed by video MCU 13. The mixed audio and video are then sent to the conference endpoints from the respective mixers. Because they are mixed separately, the mixed audio and video streams lack lip synchronization ("lipsync").

To restore lipsync, audio bridge 12 delays the output of its mixed streams. This delay may be determined by computing the difference between the video MCU delay (i.e., the amount of time that an input video image is delayed before it appears on a mixed output containing that image) and the audio bridge delay, then adding the difference between the video transport delay (i.e., the average amount of time it takes for packets to travel from the endpoint to the video MCU) and the audio transport delay. The mixer delays are constant and therefore configurable. The audio transport delay may be computed by using half the round-trip time, as computed using the real-time transport control protocol (RTCP).

The video transport delay may be estimated by the audio bridge, e.g., as a constant period either longer or shorter than the audio transport delay. Alternatively, the video transport delay may be assumed to differ from the audio transport delay by an amount equal to the transport delay of the dummy audio session between the audio bridge and the video MCU. This value may also be computed as half the round-trip time that is computed using RTCP timestamps.

In another embodiment, dummy audio channels between audio bridge 12 and video mixer 13 may also be associated with each of audio-only endpoints 16. These dummy channels may function in the same manner as dummy channels 14b and 15b. By conveying loudest speaker information for audio-only endpoints, the video MCU may be able to provide visual information about active audio-only speakers to the video endpoints (e.g. a video text overlay of the active audio speaker's name).

Figure 2:
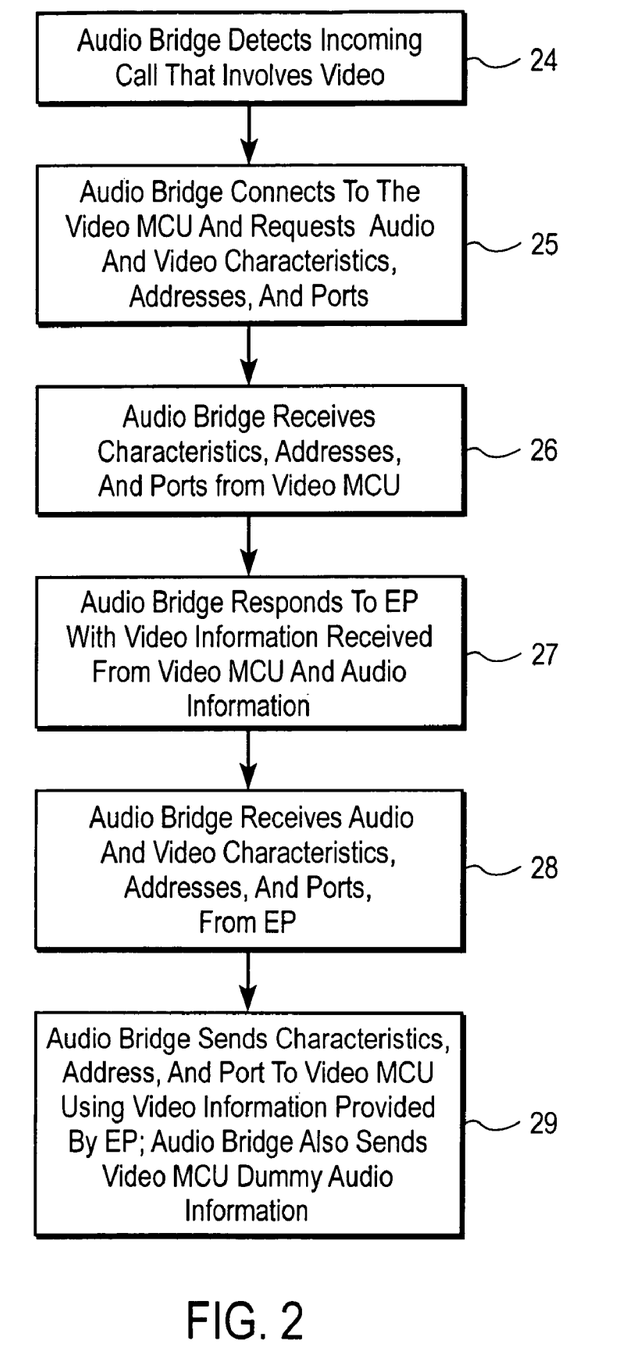
FIG. 2 illustrates an example method of operation for the audio bridge shown in FIG. 1.

FIG. 2 illustrates an example method of operation for the audio bridge shown in FIG. 1, for the case where an audio/video endpoint 17 dials in or otherwise connects to the audio bridge 12, requesting to attend a specified conference. The method begins with the audio bridge detecting an incoming call from endpoint 17 that includes, or may include, video (block 24).

The audio bridge responds by beginning a process of setting up a video session (channels 22 in FIG. 1) between endpoint 17 and the video MCU, and an audio session (channels 22 in FIG. 2) between endpoint 17 and the audio bridge 12. Separate video sessions are established for each video endpoint detected by the audio system. In block 25, the audio bridge connects to the video MCU and requests that the video MCU send audio and video characteristics, IP addresses, and IP port numbers that the video MCU wishes to use for receiving audio and video streams. The initial message from the audio bridge, for instance, may identify the meeting that the endpoint is supposed to attend.

The audio bridge then waits until it receives the requested information from the video MCU. That is, after some time, the audio bridge receives the information required for setting up media sessions to the video MCU (e.g., IP addresses and ports for audio and video streams), as well as audio and video characteristics of the video MCU. This is shown occurring in block 26.

In block 27, the audio bridge continues the dialog between itself and the endpoint by supplying the endpoint with audio characteristics, IP address, and a port on the audio bridge for receiving audio media, as well as the video characteristics, IP address, and port, which the video MCU previously sent to the audio bridge for receiving video media. The audio bridge then waits to receive, from the endpoint, the respective characteristics, addresses, and ports that will allow the endpoint to receive video from the video MCU and audio from the audio bridge (block 28).

The audio bridge completes the setup with the video bridge by providing the video bridge with the video information (i.e., characteristics, address, and port) that the audio bridge previously received from the video endpoint. At this point, the audio bridge may also provide the video bridge with the port on the audio bridge for the dummy audio connection.

Figure 6:
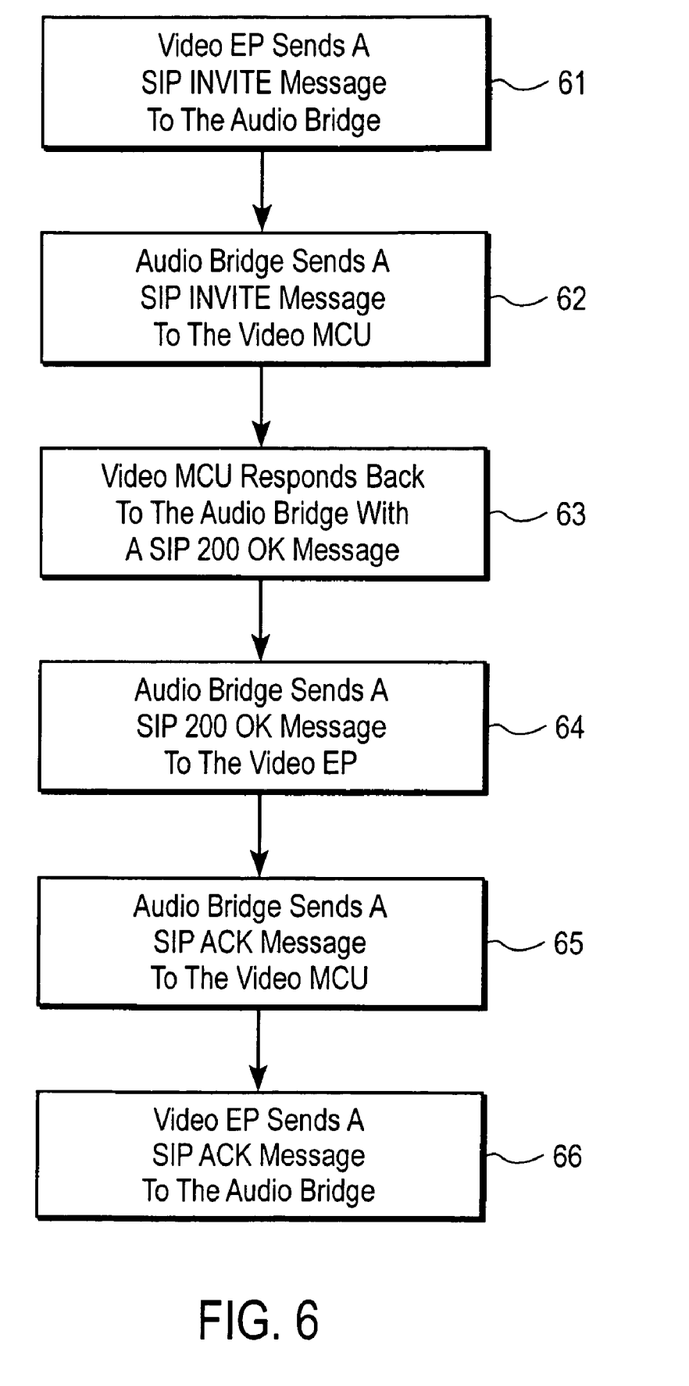
FIG. 6 illustrates still another example method of operation for the system shown in FIG. 1.

FIG. 6 illustrates still another example method of operation for the system shown in FIG. 1. The example of FIG. 6 shows a communications exchange using the Session Initiation Protocol (SIP) to set up the connections between video endpoint 17, audio bridge 12, and video MCU 13. In this example the video endpoint is located at IP address 10.1.1.1 and wishes to receive an audio RTP stream on port 1111 and a video RTP stream on port 1222. Audio bridge 12 is located at IP address 10.2.2.2 and can receive an RTP stream from endpoint 17 on port 2111. Video MCU 13 is located at IP address 10.3.3.3 and can receive an audio RTP stream on port 3111 and a video RTP stream on port 3222.

The exchange begins with a SIP INVITE message sent from the video endpoint to the audio bridge (block 61). The SIP INVITE message indicates, via information in an attached Session Description Protocol (SDP) MIME body part, that the endpoint is willing to communicate with bidirectional audio and video, wishes to receive the audio on socket 10.1.1.1:1111, and also wishes to receive video on socket 10.1.1.1:1222. Upon receiving the SIP INVITE, the audio bridge recognizes that it should set up a dummy RTP session between itself and the video MCU and allow bidirectional video to flow between the video MCU and the video endpoint. The audio bridge therefore sends a SIP INVITE message to the video MCU (block 62) with attached SDP indicating that it wishes to only to send audio RTP to the video MCU, and that it wishes to establish a bidirectional video RTP session between the video MCU and the video endpoint, with the video to be received by socket 10.1.1.1:1222 (i.e., the receive socket of the video endpoint).

In response to the SIP INVITE message received from the audio bridge, the video MCU replies back to the audio bridge with a SIP 200 OK message, with SDP indicating that it will receive audio on socket 10.3.3.3:3111 and receive video on socket 10.3.3.3:3222 (block 63). The audio bridge, upon receiving the SIP 200 OK message, sends a SIP 200 OK response message to the video endpoint (block 64) with SDP indicating that the audio bridge will receive audio RTP from the endpoint on socket 10.2.2.2:2111, with socket 10.3.3.3: 3111 (on the video MCU) receiving the video from the endpoint. In compliance with the SIP standard, audio bridge then sends the video MCU a SIP ACK message (block 65). The video endpoint also sends the audio bridge a SIP ACK message. These two SIP ACK messages indicate that the previously sent SIP 200 OK response messages were successfully received (block 66).

At this point, all of the audio and video streams are fully established. This means that dummy audio RTP messages may be sent from the audio bridge to the video MCU whenever the endpoint is an active speaker. In addition, bidirectional audio RTP messages may be exchanged between the endpoint and the audio bridge. Bidirectional video RTP messages may also be exchanged directly between the video endpoint and the video MCU.

It should be understood that the audio stream sent from each video endpoint is transmitted to the audio bridge, not to the video bridge. The audio bridge negotiates a dummy audio session between itself and the video bridge. This dummy audio session is used to send dummy audio packets to the video bridge when a corresponding video endpoint becomes the active speaker in the conference session. A separate dummy audio session may be established for each video endpoint detected by the audio bridge.

All DTMF control signaling from the endpoints, whether signaled out-of-band, in-band, or in voice-band, also flows to the audio bridge. This insures that user interface features work properly for the various endpoints, regardless of whether the endpoints are audio-only or video endpoints.

Figure 3:
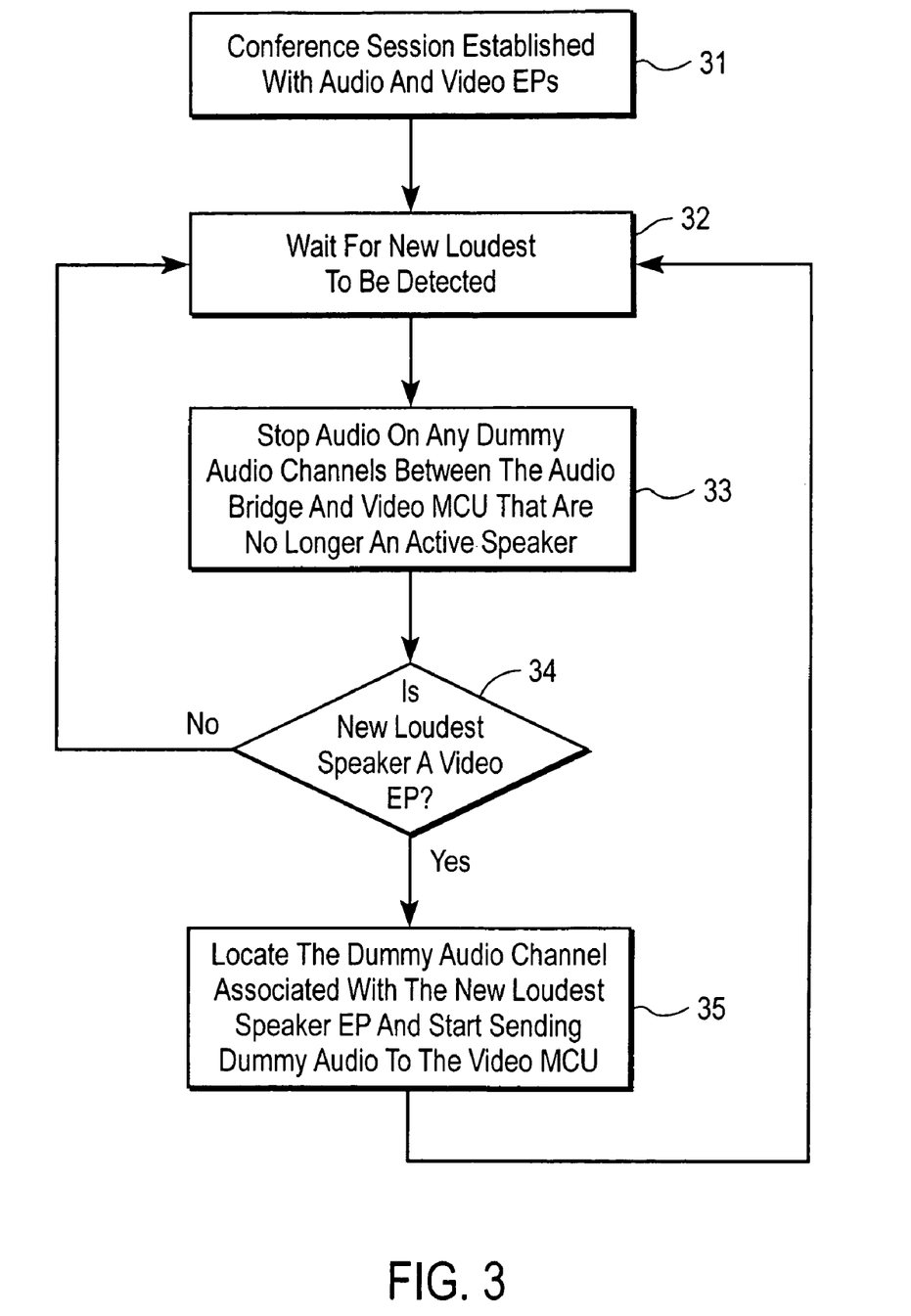
FIG. 3 illustrates an example method for handling a conference session in the system shown in FIG. 1.

FIG. 3 illustrates an example method for handling a conference session in the system shown in FIG. 1. In this example, a conference session is already established among audio and video endpoints, with the current loudest speaker being associated with one of the endpoints (block 31). The audio bridge monitors the conference session to determine whether an endpoint becomes the new current active speaker (i.e., whether a participant using an endpoint is now the loudest speaker (block 32.)

When a new loudest speaker is detected, the flow proceeds to block 33, where the audio bridge stops sending audio packets on any previously established dummy audio channels between the audio bridge and the video MCU which are no longer active speakers. The audio bridge then determines whether the new loudest speaker endpoint is a video endpoint (block 34). If not, then the audio bridge again waits for the next loudest speaker event. On the other hand, if the new loudest speaker endpoint is a video endpoint, dummy audio packets are sent by the audio bridge to the video bridge via the previously established channel that corresponds to that video endpoint (block 35).

The dummy packets represent audible speech, which triggers the video MCU to treat the session associated with the dummy channel as the new active (loudest) speaker and also take whatever actions are necessary to represent that endpoint as the active speaker. These actions may include, but are not limited to, switching video output streams to include the video image received from the video endpoint that is currently the active speaker, switching an output stream to the active speaker endpoint to display the image of the previous speaker, compositing the active speaker's image into a continuous presence display, and overlaying text indicating the name of the active speaker on a video image.

At this point, control returns to block 32 to wait for the next loudest speaker event. In this way, dummy audio packets representing audible speech continue to flow over the associated audio channel between the audio bridge and the video MCU until the speaker changes. Because the audible speech is used for active speaker detection and is not returned to any of the participant endpoints, the dummy audio clip may be very short, thereby consuming minimal memory on the audio bridge.

Practitioners will appreciate that the compute load required to send the dummy audio is relatively low, since pre-recorded, pre-encoded, pre-packetized speech may be used. Insertion of a valid RTP header onto the audio packet may include inserting an RTP sequence number that increments by one for each subsequent packet and a current RTP timestamp for each packet.

In certain embodiments, the video bridge may handle multiple active speakers. In such cases, the dummy packets may be sent simultaneously on more than one channel between the audio mixer 12 and the video MCU 13.

Figure 4:
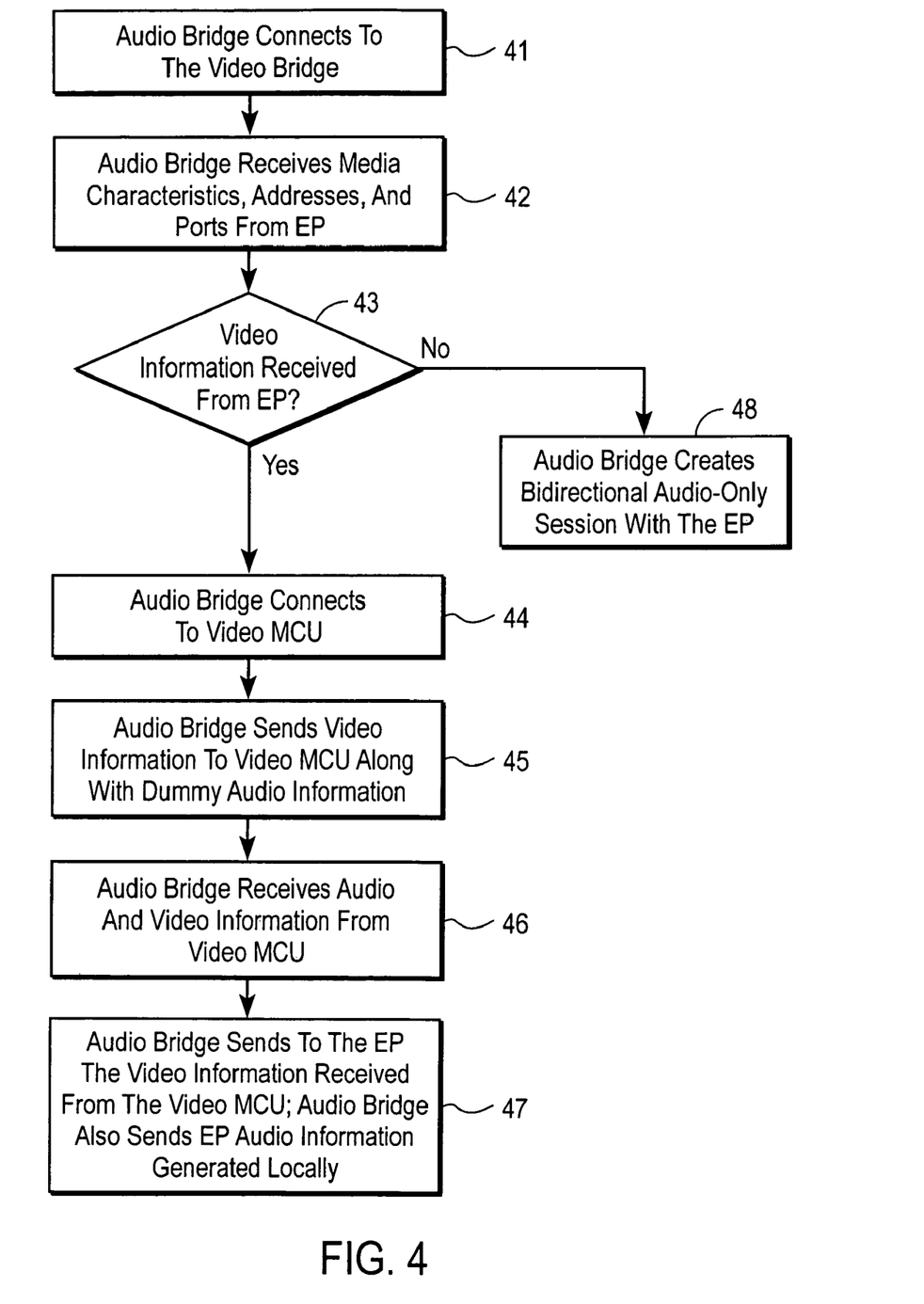
FIG. 4 illustrates another example method of operation for the system shown in FIG. 1.

FIG. 4 illustrates another example method of operation for the system shown in FIG. 1. The example of FIG. 4 shows a process that begins with audio bridge 12 attempting to connect or dial out to an endpoint, rather than having the endpoint connect to the audio system (block 41). The audio bridge then waits for the endpoint to respond with media information consisting of media characteristics, IP addresses, and IP port numbers (block 42). The audio bridge checks the media information returned from the endpoint to determine if the endpoint wishes to establish a video session, as indicated by the presence of video characteristics, address, and port (block 43). If the endpoint is an audio-only endpoint, the audio bridge proceeds to generate corresponding audio characteristics, address, and port and sends them back to the endpoint, thereby creating a bidirectional audio-only session.

In the event that the media information received from the endpoint contains video information, the audio bridge connects to the video MCU (block 44). The connection information sent out by the audio bridge may indicate or identify the scheduled meeting. Once a connection has been established, the audio bridge sends the video MCU the video characteristics, address, and port number it previously received from the endpoint, along with a set of audio characteristics, address, and port number for establishing a dummy audio channel between the audio bridge and the video MCU (block 45).

The audio bridge then waits to receive corresponding audio and video information from the video MCU (block 46), completing the establishment of the dummy audio session between the audio bridge and the video MCU. Once that information has been received, the audio bridge completes session establishment with the endpoint by sending, to the endpoint, the video characteristics, address, and port the audio bridge previously received from the video MCU. The audio bridge also sends to the endpoint the audio characteristics, address, and port that the audio bridge generates locally (block 47). A bidirectional audio session is thus established between the audio bridge and the endpoint, and a bidirectional video session between the endpoint and the video MCU.

Figure 5:
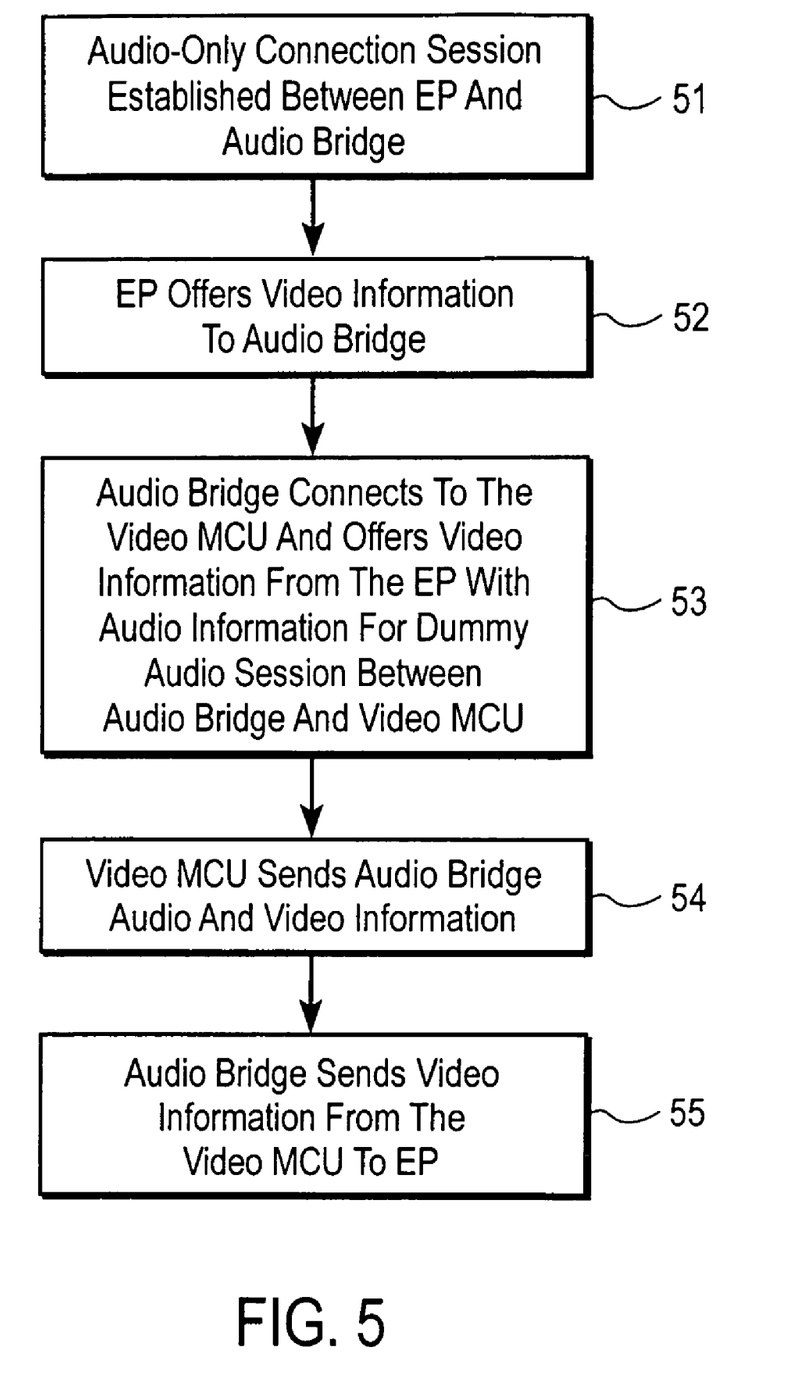
FIG. 5 illustrates yet another example method of operation for the system shown in FIG. 1.

FIG. 5 illustrates yet another example method of operation for the system shown in FIG. 1, which begins with an audio-only connection being established between the audio bridge and a video capable endpoint (block 51). That is, an audio media session is setup between the endpoint and the audio bridge. At some point, the endpoint begins offering video to the audio bridge by sending video characteristics, IP address, and IP port number (block 52). In response the audio bridge connects to the video MCU (block 53), then offers the video information from the endpoint, along with audio characteristics, address, and port for a dummy audio session between the audio bridge and the video MCU (block 53).

The video MCU responds by sending audio and video information back to the audio bridge (block 54). At this point, the dummy audio session between the audio bridge and the video MCU is completely established. This dummy audio connection is used to send a default or generic audio clip from the audio bridge to the video MCU when the video endpoint becomes the active speaker (or Nth loudest speaker) in the conference session.

The audio bridge completes the establishment of the video session with the endpoint by forwarding the video information from the video MCU to the endpoint, thereby directing the endpoint to send video directly to the video MCU while preserving the existing audio session between the endpoint and the audio bridge (block 55).

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMS, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. For instance, while the preceding examples contemplate a single audio bridge handling the entire conference session, the concepts discussed above are applicable to other systems that utilize distributed bridge components, or which distribute user interface control over the conference session. Accordingly, the specification and drawings are to be regarded in an illustrative rather than a restrictive sense.

We claim:

1. A method comprising:
    detecting, by an audio conferencing bridge, an attempt by an endpoint to establish a plurality of multimedia sessions;
    negotiating a dummy session between the audio bridge and the video MCU, the dummy session for indicating to the video MCU when the endpoint is an active speaker in a conference session; and
    sending a generic audio clip to the video MCU in response to the endpoint becoming the active speaker.

2. The method of claim 1 wherein the endpoint is operable to send and receive a video session.

3. The method of claim 1 further comprising negotiating, by the audio conferencing bridge, a video session between the endpoint and the video MCU.

4. The method of claim 1 further comprising establishing an audio session between the endpoint and the audio conferencing bridge.

5. The method of claim 1 wherein the generic audio clip comprises audible speech.

6. The method of claim 1 further comprising halting the sending of the generic audio clip to the video MCU when the endpoint is no longer the active speaker.

7. The method of claim 1 wherein the generic audio clip comprises a plurality of packets, and further comprising attaching an RTP header that includes a sequence number and a timestamp to each packet of the generic audio clip.

8. The method of claim 1 wherein the active speaker comprises one of a plurality of loudest speakers in the conference session.

9. A method comprising:
    receiving audio media streams from a plurality of endpoints participating in a conference session, the endpoints including audio-only endpoints and video endpoints;
    receiving control signals from the plurality of endpoints;
    establishing a video media channel between each of the video endpoints and a video multipoint control unit (MCU);
    detecting that a first video endpoint is an active speaker in the conference session;
    sending a pre-recorded audio clip to the video MCU over an audio channel associated with the first video endpoint, the video MCU sending an image of a user of the first video endpoint to one or more of the video endpoints in response to the pre-recorded audio clip.

10. The method of claim 9 wherein the pre-recorded audio clip comprises audible speech.

11. The method of claim 9 further comprising:
    detecting that the first video endpoint is no longer the active speaker; and
    halting the sending of the pre-recorded audio clip to the video MCU.

12. The method of claim 9 wherein the pre-recorded audio clip comprises a plurality of packets, and further comprising attaching an RTP header that includes a sequence number and a timestamp to each packet of the pre-recorded audio clip.

13. The method of claim 9 wherein the control signals comprise dual tone, multi-frequency (DTMF) commands.

14. The method of claim 9 further comprising mixing the audio media streams to produce one or more mixed audio output streams.

15. The method of claim 14 further comprising delaying the one or more mixed audio output streams.

16. The method of claim 15 further comprising computing a half round-trip delay over the audio channel, the one or more mixed audio output streams being delayed in correspondence with the half round-trip delay plus an additional delay corresponding to a mixing delay between the audio conferencing bridge and the video MCU.

17. A computer readable memory encoded with a non-transitory computer program product, when executed the non-transitory computer program product being operable to:
    detect when a first video endpoint becomes an active speaker in a conference session among one or more audio-only endpoints and a plurality of video endpoints which includes the first video endpoint;
    send a dummy audio stream to a video bridge via an audio channel that corresponds to the first video endpoint, the dummy audio stream including generic audio that causes the video bridge to include an image received from the first video endpoint in an output video stream;
    detect when the first video endpoint is no longer the active speaker; and
    halt the sending of the dummy audio stream.

18. The computer readable memory of claim 17 wherein the non-transitory computer program product, when executed, is further operable to:
- receive audio streams from the one or more audio-only endpoints and the video endpoints; and
- mix the audio streams into one or more output audio streams.

19. The computer readable memory of claim 17 wherein the non-transitory computer program product, when executed, is further operable to:
- receive first command signals from the one or more audio-only endpoints and second command signals from the video endpoints, the first and second command signals being in a first format;
- translate the second command signals into a second format compatible with the video bridge; and
- send the second command signals in the second format to the video bridge.

20. The computer readable memory of claim 19 wherein the first and second command signals comprise dual tone, multi-frequency (DTMF) keypad sequences.

21. The computer readable memory of claim 17 wherein the non-transitory computer program product, when executed, is further operable to delay the one or more mixed audio output streams.

22. A method comprising:
- detecting, by an audio conferencing bridge, an attempt by an audio/video (A/V) endpoint to establish a video session;
- negotiating, by the audio conferencing bridge, a session between the A/V endpoint and a video multipoint control unit (MCU);
- negotiating a dummy session between the audio bridge and the video MCU, the dummy session for indicating to the video MCU when the A/V endpoint is an active speaker in a conference session; and
- sending a generic audio clip to the video MCU in response to the A/V endpoint becoming the active speaker.

23. The method of claim 22 further comprising establishing an audio session between the A/V endpoint and the audio conferencing bridge.

24. The method of claim 22 wherein the generic audio dip comprises audible speech.

25. The method of claim 22 further comprising halting the sending of the generic audio clip to the video MCU when the A/V endpoint is no longer the active speaker.

* * * * *